United States Patent Office 3,297,844
Patented Jan. 10, 1967

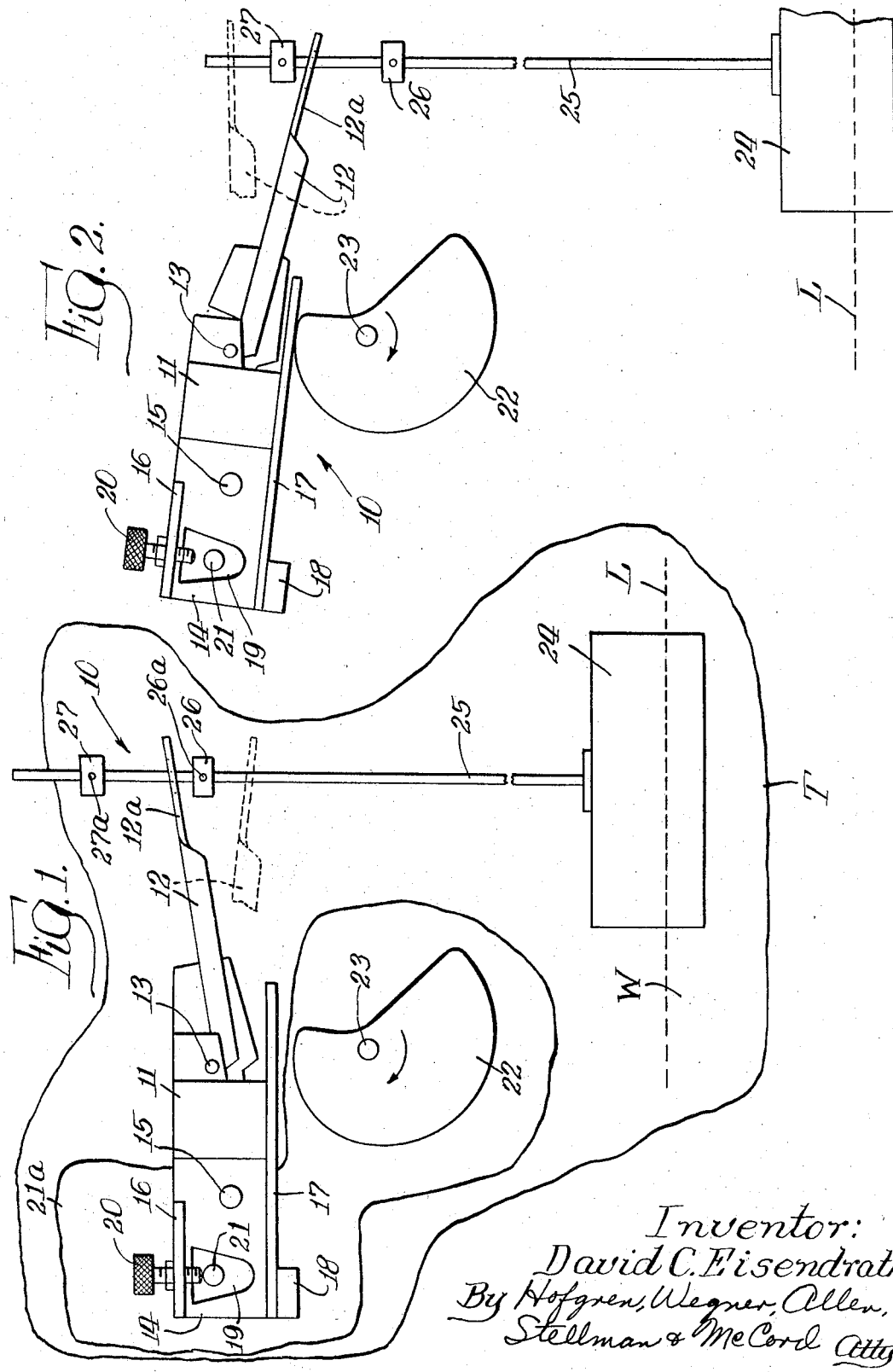

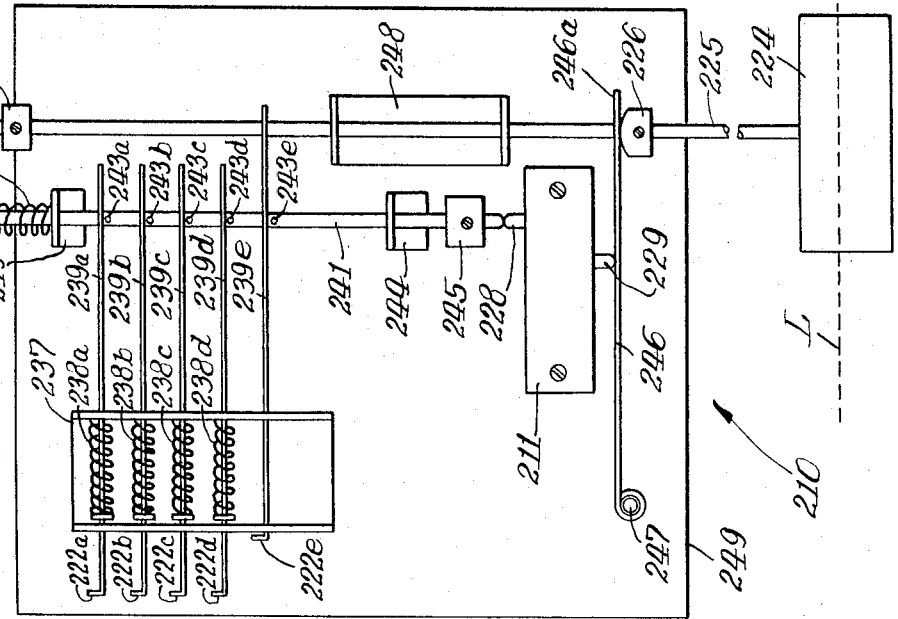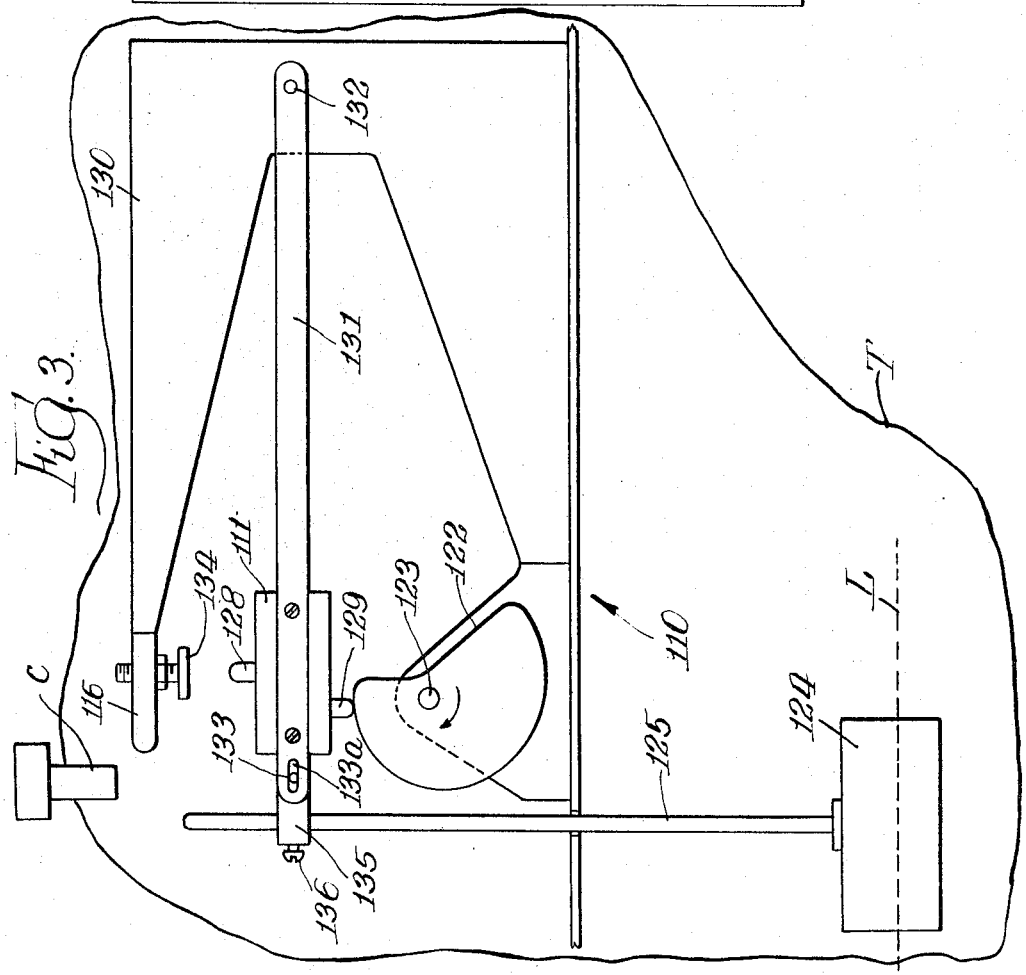

3,297,844
PIVOTALLY MOUNTED SWITCH HAVING PIVOTALLY MOUNTED ACTUATING ARM OPERATED IN RESPONSE TO VARIATIONS IN LIQUID LEVELS
David C. Eisendrath, Chicago, Ill., assignor to Cory Corporation, a corporation of Delaware
Filed Oct. 21, 1965, Ser. No. 499,307
6 Claims. (Cl. 200—84)

This invention relates to control devices and in particular to controls for providing a signal responsive to a variation in a liquid level for use in apparatus such as coffee brewing apparatus.

In one form of coffee brewing apparatus, water is heated in a tank and a preselected quantity thereof is discharged through a suitable brewing means for brewing a preselected quantity of beverage such as coffee. The amount of water delivered from the tank is controlled by a float operated means responsive to the level of the water in the tank so that when the level drops a preselected amount from a full level suitable switches are operated to discontinue the delivery of the hot water from the tank and permit the refilling of the tank with cold water for subsequent heating and use in further brewing operations. The present invention is concerned with an improved control for use with such a float operated delivery means which permits ready adjustability of the quantity of hot water delivered from the tank.

Thus, a principal feature of the present invention is the provision of a new and improved control for providing a signal responsive to a variation in a liquid level.

Another feature of the invention is the provision of such a control having new and improved means for providing facilitated adjustability in the amount of liquid delivered from a tank as a function in the change in liquid level thereof.

A further feature of the invention is the provision of such a control which is extremely simple and economical of construction while yet providing long trouble-free life.

Still another feature of the invention is the provision of such a control having new and improved means for operating a switch thereof at any one of a plurality of preselected lower levels.

Another feature of the invention is the provision of such a control wherein the adjustable means is infinitely adjustable.

Still another feature of the invention is the provision of such a control wherein the adjustable means provides any one of a preselected number of discrete liquid level conditions.

A further feature of the invention is the provision of such a control including a control switch, first operator means for operating said switch as a result of movement of the means relative to the switch, second operator means movable as a function of variations in the liquid level and including means for moving the first operator means in response to a variation in the liquid level, and adjustable means for causing the first operator means to operate the switch selectively as the result of any one of a plurality of different amounts of movement of the second operator means.

Other features and advantages of the invention will be apparent from the following description taken in connection with the accompanying drawing wherein:

FIGURE 1 shows a schematic elevation of a control embodying the invention with the control as arranged in a tank full condition;

FIGURE 2 is a schematic elevation generally similar to that of FIGURE 1 but with the control arranged in a selected low liquid level condition;

FIGURE 3 is a schematic elevation of a modified form of control embodying the invention; and FIGURE 4 is a schematic elevation of a further modified control embodying the invention.

In the exemplary embodiment of the invention as disclosed in FIGURES 1 and 2 of the drawing, a control generally designated 10 is shown to include a control switch 11 arranged to be operated by a first operator, or switch actuating arm, 12 pivotally carried by the switch on a pivot 13. The switch 11 and the arm 12 are mounted as a unit on a bracket 14 which in turn is pivotally mounted on a pivot pin 15. As shown in FIGURE 1, the bracket includes a short upper flange 16 and a long lower flange 17. The bracket is provided with a counterweight 18 at the lower left-hand end as shown in FIGURE 1, which generally balances the entire assembly on the pivot pin 15 as seen in FIGURE 1. An opening 19 is provided in the web of the bracket. An adjustable screw 20 is threaded through the flange 16 to engage a pin 21 carried on a support plate 21a rearwardly of the control assembly.

A cam 22 is pivotally mounted on a pivot 23 carried on the plate 21a subjacent the flange 17 of bracket 14.

A float 24 arranged to be disposed in the liquid W at the upper level L is provided with an upright rod 25 carrying a pair of vertically spaced collars 26 and 27 adjustably secured to the rod by suitable means such as screws 26a and 27a, respectively. Thus, collars 26 and 27 comprise an adjustable abutment means on the float rod 25 for pivoting the actuating arm 12 relative to the switch when the switch is retained against pivotal movement as by the limiting action of screw 20 or cam 22 as will be brought out in detail hereinafter. As shown in FIGURE 1, the operator arm 12 includes a finger portion 12a adapted to be engaged by the collars 26 and 27 at the vertical extremes of movement of the rod 25 as the level L of the liquid W rises and lowers.

In operation, the liquid level L in the tank T will normally be at an upper level as shown in FIGURE 1. The counterweight 18 will dispose the switch 11 and arm 12 in a relatively elevated position intermediate the collars 26 and 27 on the float rod 25. As the level of liquid L lowers, such as during a beverage brewing operation, the rod 25 moves downwardly with float 24 until collar 27 engages the finger portion 12a of arm 12. The downward pressure on the arm 12 will firstly act to pivot the entire switch assembly in a clockwise direction against the biasing force of counterweight 18 until the lower flange 17 strikes the confronting surface of the cam 22. This abutment prevents further downward movement of the bracket 14 carrying the switch 11, and further downward movement of the collar 27 therefore causes relative movement between the arm 12 and the switch 11 about the pivot 13, thereby operating the switch 11 to provide the desired signal at the low liquid level, as shown in FIGURE 2. To adjust the response of the switch 11 to cause operation thereof at any one of a plurality of different low liquid levels, the operator need merely rotate the cam 22 so as to present upwardly different portions of the cam having different radial spacing from the pivot 23 so that the clockwise pivoting of the bracket 14 and switch 11 caused by the initial downward force of collar 27 on arm 12 will be selectively limited to any one of the different settings of the cam. As will be obvious to those skilled in the art, any means may be provided for adjusting the position of the cam including manually operable means and the like.

As indicated briefly above, upon reaching the lower liquid level, the apparatus normally would be arranged to refill the tank through a suitable valved supply means C so as to raise the liquid level back to the full level such as shown in FIGURE 1. Such filling means are conventional in the art and need no further disclosure herein.

When the liquid level L begins to rise, the collar 27 moves upwardly away from the finger 12a of arm 12, permitting the counterweight 18 to bias the bracket and switch assembly in a counterclockwise direction until the screw 20 abuts the pin 21 limiting further counterclockwise pivotal movement of the assembly. As the rod 25 continues to move upwardly with the float 24, the collar 26 eventually strikes the underside of finger 12a of arm 12, thereby acting to pivot the arm 12 in a counterclockwise direction about pivot 13 and operating double throw switch 11 in its second mode of operation so as to provide a second signal such as may be used in closing valved supply C thereby discontinuing the filling operation.

It should be noted that in each direction of movement of the float, the switch 11 is selectively controlled so as to provide an operation thereof at any one of a plurality of different liquid levels. In the downward movement of the float, the selective control of the operation of switch 11 is by means of the adjustable cam 22, and in the upward direction by the adjustable screw 20. The particular adjustable means are illustrative, it being obvious to those skilled in the art that many other different adjustable devices may be suitably employed in lieu thereof. Further, the disposition of the collars 26 and 27 on the rod may be suitably selected for the particular arm length and switch operational movement so as to provide further adjustable control of the apparatus 10.

Referring now to FIGURE 3, a modified form of control generally designated 110 is shown to comprise a control switch 111 carried on a pivot arm 131 mounted on plate 130 by a pivot 132. The switch includes a lower operator 129 and an upper operator 128. The arm 131 is connected to the float rod 125 by a connector 135 suitably secured to the rod by means such as screw 136. As shown, the rod 131 may be connected to the connector 135 by a pin 133 on connector 135 suitably received in an elongated slot 133a on the rod 131, thereby accommodating the relative angular movement of the rod about pivot 132 to the substantially vertical upward and downward movement of the connector 135. The cam 122 is mounted on the pivot 123 to be subjacent the operator 129, and the adjustable screw 134 is mounted on the flange 116 of the plate 130 to be adjustably positionable superjacent the upper operator 128.

In operation, control 110 functions generally similarly to control 10. More specifically, as float 124 moves downwardly in following a decrease in the liquid level L, the switch 111 carried on the rod 131 moves downwardly until the operator 129 engages the confronting surface of the cam 122. Obviously, the particular setting of the cam 122 will control the particular level L at which the operator 129 is actuated to operate the switch 111. In the refilling operation, the float moves upwardly to carry switch 11 upwardly therewith until the upper operator 128 engages the screw 134 to thereby operate the switch in the second mode of operation. Thus, the control 110 provides adjustability in the cam 122, screw 134 and in the positioning of the connector 135 on the rod 125 for suitably adjustably controlling the operation of the switch 111.

Referring now to FIGURE 4, a further modified form of control generally designated 210 includes a switch 211 carried on the plate 249. The control switch 211 includes an upper operator 228 and lower operator 229. The lower operator is actuated by an arm 246 pivotally connected to the plate 249 by a pivot 247 and having an end portion 246a disposed superjacent a collar 226 on the rod 225 upstanding from float 224. Thus, when the level L rises to the preselected high level, the collar 226 pivots the arm in a counterclockwise direction to actuate the operator 229 and operates switch 211 in this mode of operation.

The control of the lower level of liquid in control 210 is by means of selective push-buttons 222a, 222b, 222c and 222d provided at one end of leaf springs 239a, 239b, 239c and 239d, respectively. The push-buttons are biased to a released position by suitable springs 238a, 238b, 238c and 238d, respectively. The float rod 225 is provided with an upper collar 227 which in moving downwardly with the float during a descending liquid level condition will strike a selected one of the springs 239a–239d depending on which push-button has been depressed to move the spring to the right as seen in FIGURE 4 to subjacent the collar 227. The springs extend respectively superjacent a plurality of pins 243a, 243b, 243c and 243d provided on an operator rod 241 biased in an upward direction by a spring 242 and provided at its lower end by an actuator 245 arranged to engage upper operator 228 of switch 211. Thus, when collar 227 moves downwardly against a selected one of the leaf springs, it forces the spring downwardly against its associated pin to move the rod 241 downwardly with the float 224 and cause the actuator 245 to move operator 228 and thereby operate switch 211. Illustratively, if a relatively high level corresponding to a small quantity of dispensed water is desired, the operator merely pushes the upper push-button 222a so as to dispose the leaf springs 239a in the path of movement of collar 227. The downward movement of the collar then presses the spring 239a against the pin 243a so as to actuate switch 211 at a relatively high level of the liquid. Obviously, the three other push-buttons illustrated provide for operation of the switch 211 at progressively lower discrete positions of the liquid level. A lowermost leaf spring 239e is provided with a push-button 222e arranged to be disposed in a depressed position at all times so as to provide a lowermost control of the switch 211 assuring the discontinuance of the lowering of the liquid level when the collar 227 reaches the preselected lowermost position corresponding to the position of the leaf spring 239e.

The rod 225 may be suitably vertically, slidably mounted in a carrier 248 and the rod 241 may be suitably vertically, slidably mounted in a pair of mounts 240 and 244. The coil springs 238a–238d and leaf springs 239a may be suitably mounted in a mount 237. The particular spring and push-button arrangement is illustratively only, it being obvious to those skilled in the art that many other similar structures may be equivalently employed in following the structural concept embodied in the invention.

Thus, control 210 functions generally similar to controls 10 and 110, but provides for discrete liquid levels rather than the infinitely adjustable liquid levels of the other two embodiments. Control 210 is similar to the other embodiments in providing for adjustable level control in a novel and simple manner with each of the lowermost and uppermost levels being selectively controlled.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A control for providing a signal responsive to a variation in a liquid level, comprising:
   a control switch having
      an actuating arm pivotally mounted on said switch for operating said switch as a result of pivotal movement of said arm relative to said switch;
   abutment means for pivotally moving said actuating arm in accordance with a variation in the liquid level;
   means for pivotally mounting said switch and actuating arm as a unit; and
   adjustable stop means for limiting the pivotal movement of said switch in opposite pivotal directions whereby said abutment means, as an incident of a preselected raising or lowering of the liquid level, pivots the switch and actuating arm as a unit to the position wherein the adjustable stop means engages said unit to further pivoting of the switch, and further pivots said actuating arm relative to said switch upon further raising or lowering of the liquid level beyond said preselected level to cause said actuating arm to operate said switch selectively as the result of any one of a plurality of different amounts of movement of said abutment means.

2. The control of claim 1 wherein said adjustable means is continuously adjustable.

3. The control of claim 1 wherein said adjustable means comprises a manually operable cam.

4. The control of claim 1 wherein said adjustable means includes means for causing operation of said switch at a preselected minimum liquid level.

5. The control of claim 1 including means for biasing said switch and actuating arm as a unit to a preselected mid-position.

6. The control of claim 1 wherein said adjustable means comprises means for pivotally mounting said switch and actuating arm as a unit, said adjustable means limits the movement thereof to two opposite extreme positions, and said control further includes means for balancing said switch and actuating arm as a unit to a position intermediate said extreme positions.

References Cited by the Examiner

UNITED STATES PATENTS 2,467,134   4/1949   Iveson _____ 200—84

FOREIGN PATENTS 775,882   5/1957   Great Britain.

BERNARD A. GILHEANY, *Primary Examiner.*

H. A. LEWITTER, *Assistant Examiner.*